Patented Oct. 25, 1932

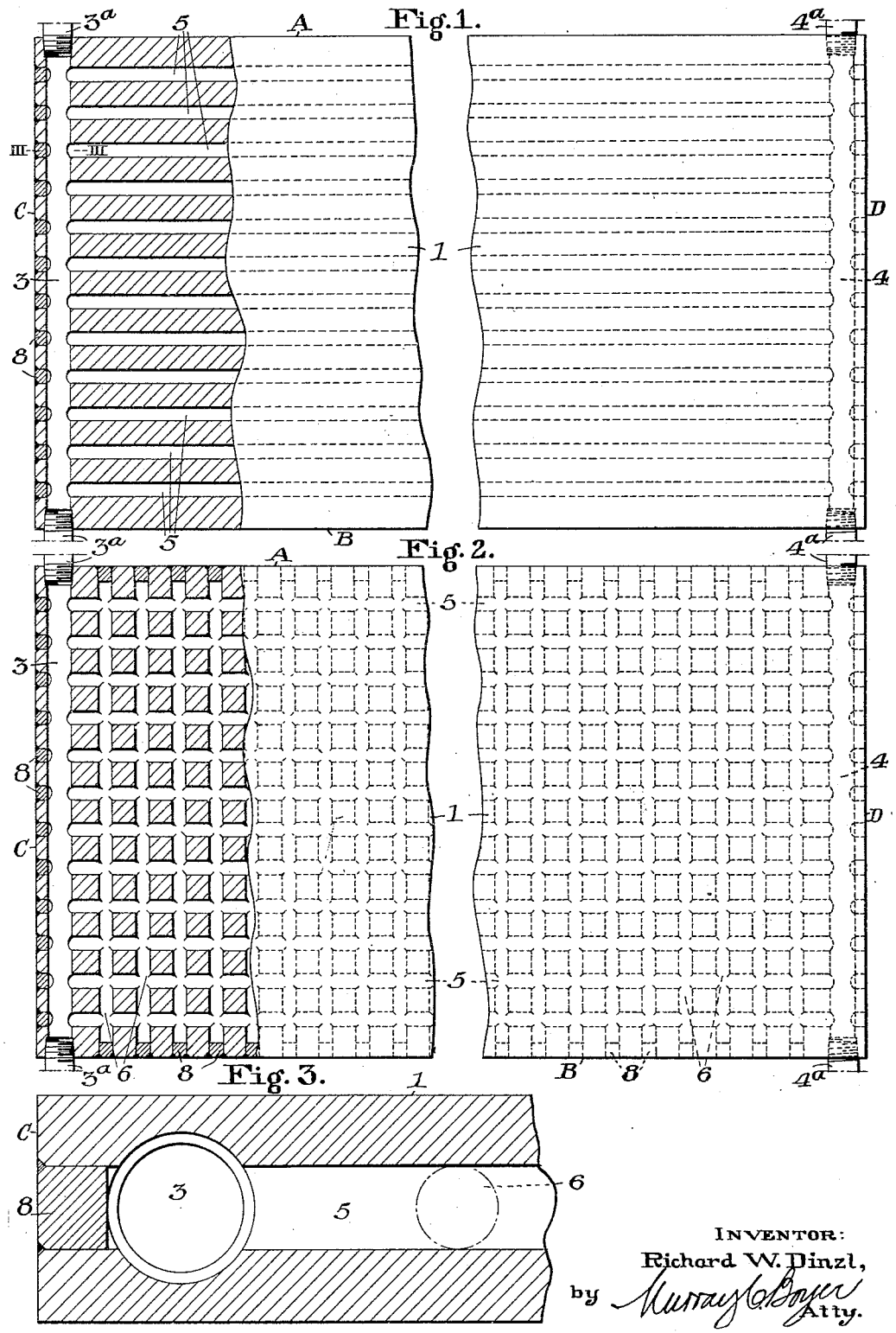

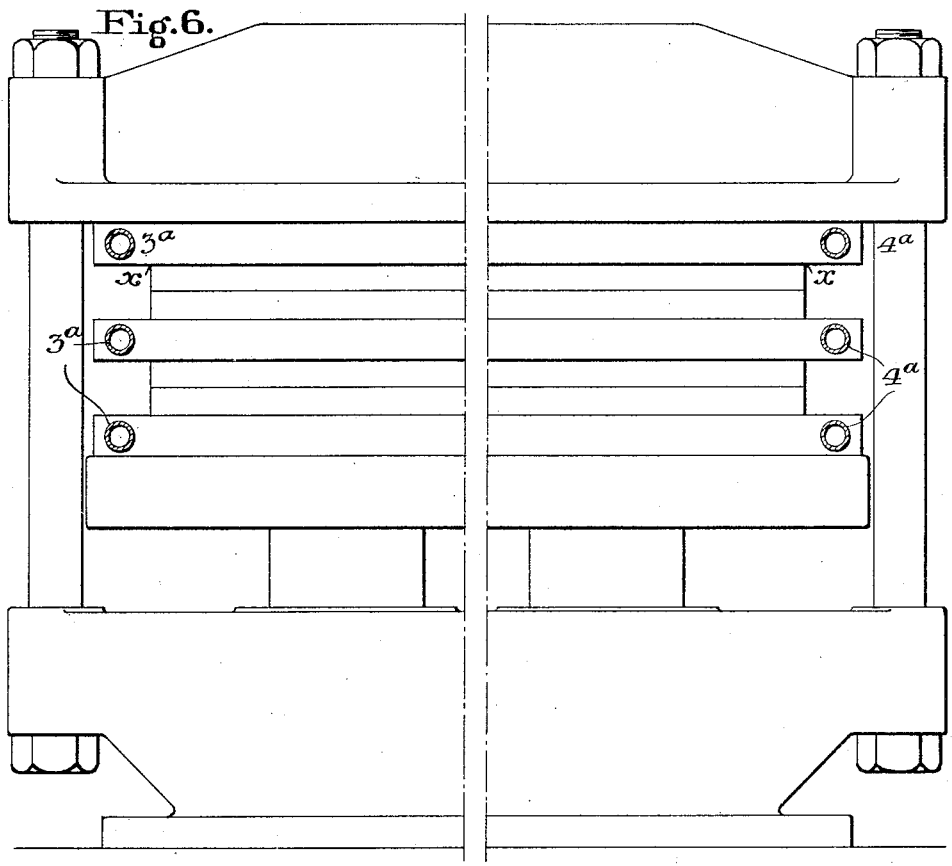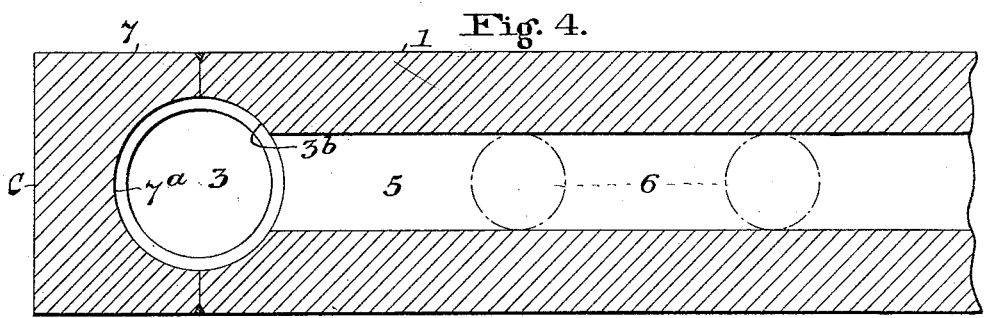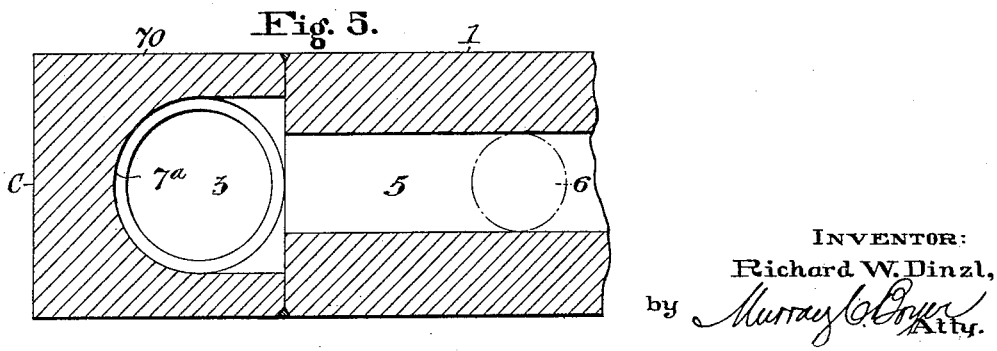

1,884,612

UNITED STATES PATENT OFFICE

RICHARD W. DINZL, OF PHILADELPHIA, PENNSYLVANIA, ASSIGNOR TO SOUTHWARK FOUNDRY & MACHINE COMPANY, OF PHILADELPHIA, PENNSYLVANIA, A CORPORATION OF PENNSYLVANIA

STEAM PLATEN

Application filed March 14, 1930. Serial No. 435,766.

My invention relates to steam plates or as they are called "platens", such as are employed in the curing, vulcanizing, or other heat treatment of rubber and composition goods, synthetic resins, bakelite and the like, or for other purposes where a heated plate is required; such plates having internal passages for the circulation of steam or other heating medium, and in some instances a cooling medium, in other words a "temperature-controlling" medium. For such purpose provision is made for the introduction and withdrawal of such temperature-controlling media and in order that the latter may be circulated continuously throughout the whole extent of the plate or plates, the passages therein are in communication with each other and provide a continuous conduit.

The present invention comprises a plate or platen which has been developed for work where uniform heat distribution is of importance and it comprises a plate which may be rectangular in shape having relatively large manifold passages adjacent the ends of the same, which manifold passages are connected by a plurality of passages extending at right angles thereto longitudinally of the plate. In some instances it may be desirable to add a plurality of cross passages intermediate the manifold passages and paralleling the same.

The plate forming the subject of my invention is intended for use in presses receiving a plurality of the plates and between which the molds containing the material to be heated or vulcanized is placed, and such plate is made larger than the desired working surface so that the portions having the enlarged manifold passages may be entirely outside the molds and in some instances outside the press.

These and other features of my invention are more fully described hereinafter; reference being had to the accompanying drawings, in which:

Figure 1 is a plan view of a steam plate or platen having internal passages formed in accordance with my present invention.

Fig. 2 is a modification of the plate or platen shown in Fig. 1.

Fig. 3 is an enlarged sectional view on the line III—III, Fig. 1.

Figs. 4 and 5 are views similar to Fig. 3 illustrating modified arrangements within the scope of my invention, and Fig. 6 is a view, more or less diagrammatic in character of a press showing the manner of employing my improved plate therein.

In the drawings, 1 represents the body of the plate or platen, which is preferably of rolled steel and of uniform thickness throughout its entire extent. This plate may be rectangular in contour and in the drawing, (and for illustrative purposes only), it is indicated as being slightly longer than wide; the marginal sides or edges indicated at A and B, being somewhat longer than the marginal sides or edges indicated at C and D. This shape, however, is not representative of all plates embodying my invention, and my invention is not limited to any dimensions of either width or length relatively to each other, as square plates, or plates having a relatively great length with respect to the dimensions which may be termed the width, may have the features which constitute my present invention. For the purpose of description only, the marginal edges indicated at A and B may represent the "length" of the plate, and the marginal edges indicated at C and D may represent the "width" of the plate.

The ends of the plate are drilled entirely through the plate to provide cross passages indicated at 3 and 4; such passages being adjacent to the marginal edges C and D and for identification purposes but not as a limitation, the passage indicated at 3 may be connected to inlet pipes 3$^a$ at each end thereof; such inlet pipes carrying a suitable temperature-controlling medium which may be steam or hot water for the heating operation and cool air or cold water for the cooling operation, while the passage indicated at 4 may have its ends connected to suitable exhaust outlets 4$^a$. The arrangement for inlet and exhaust communication with the manifold passages 3 and 4 may be reversed, if desired, without departing from my invention.

Between the manifold cross passages 3 and 4, I provide passages 5 at right angles thereto, which passages 5 are much smaller in cross sectional area than said manifold cross passages 3 and 4; the relation being approximately three to one. On account of the large size of the manifold serving as the inlet passage with respect to the passages 5 and the fact that it can be fed from either side of the plate there will be a uniform flow of steam or cooling water through all of the passages and consequently a uniform distribution of heating or cooling media. As this uniform distribution of heat follows from the fact that a difference in area exists between the manifold passages 3 and 4 and the passages 5 at right angles thereto, it is possible to increase the heating surface by providing additional cross passages of the same area as the passages 5 and paralleling the manifold passages 3 and 4; such additional passages being indicated at 6 in Fig. 2. In other respects the plate illustrated in Fig. 2 is of the same character as that shown in Fig. 1, with manifold passages for inlet and exhaust at the ends of the same and of the same size as those illustrated in Fig. 1.

In all instances one of the manifold cross passages at an end of the plate is an inlet passage and the manifold passage at the opposite end of the plate is the exhaust passage; such passages being indicated at 3 and 4 respectively. The heating and/or cooling medium introduced into opposite ends of the manifold 3 from the connections 3$^a$ passes to the manifold 4 via the passage 5, and may exhaust from said manifold 4 via the connections 4$^a$ at opposite ends of the same.

In the development of a plate of this character it is desirable, of course, that the manifold passages be outside the zone of the plate receiving the molds containing the material to be heated, vulcanized, or otherwise treated, and in the use of such plates the working surface begins at a point a short distance inwardly of the edges C and D and clear of the said manifolds as, for instance, the point $x$, Fig. 6, to avoid the hotter places directly over the manifolds. In other positioning of the plates in a press the manifold passages may be entirely outside the same.

In view of the fact that the manifold passages are designed to be outside the molds and in some instances entirely outside the press, it is possible to provide a plate having such enlarged manifolds at the ends by welding or otherwise securing sections to such ends. In Figs. 4 and 5 I have illustrated arrangements within the scope of my invention.

In the formation of a plate of the type illustrated in Fig. 4, such plate may be drilled from end to end to form the passages 5 paralleling the edges A and B; the ends may then be grooved as indicated at 3$^b$, and then end sections 7, having matching grooves 7$^a$ may be placed at the ends of the plate and welded or otherwise secured thereto. In the arrangement illustrated in Fig. 5, the manifold may be formed entirely in the added section 70; the groove 7$^a$ of the same being slightly deeper than that illustrated in Fig. 4, and the ends of the plate to which said sections are attached having plane surfaces.

In all the forms of the plates the ends of the cross passages which open through the edges of the plates will be closed by suitable plugs 8 which may be welded in place electrically or otherwise, or secured in any suitable manner.

I claim:

1. A steam platen comprising a thin walled plate of metal having enlarged cross passages adjacent opposite ends thereof and a plurality of drilled passages of less diameter connecting the same and inlet and exhaust connections for the circulation of temperature-controlling media connected to said enlarged passages, said connecting passages of lesser diameter extending through the platen at right angles to said enlarged cross passages and in direct communication therewith.

2. A steam platen comprising a thin walled plate of metal having enlarged cross passages adjacent the ends and beyond the bearing surface of the platen thereof extending from side to side of the platen, connections secured to the opposite ends of said passages for the circulation of a temperature-controlling medium, and a plurality of drilled connecting passages of lesser diameter communicating with said cross passages and extending through the platen at right angles thereto.

3. A steam platen comprising a thin walled plate of metal having an enlarged manifold passage adjacent each end thereof and beyond the bearing surface of the platen and extending from side to side of the platen, a plurality of drilled connecting passages of lesser diameter communicating with said manifold passages and extending through the platen at right angles to said manifold passages, and connections secured to the opposite ends of said manifold passages for the circulation of a temperature-controlling medium.

4. A steam platen comprising a thin walled plate of metal having end cross passages of one diameter forming manifolds and serving as inlet and exhaust drilled passages and beyond the bearing surface of the platen, a series of passages of less diameter than said cross passages arranged at right angles to the same and affording communication therebetween; said drilled passages extending entirely through the plate means for closing the ends of said smaller passages, and connections secured to the opposite ends of said manifold passages for the circulation of a temperature controlling medium.

In witness whereof I have signed this specification.

RICHARD W. DINZL.